INVENTORS
ARTHUR J. RIDEOUT
THOMAS K. WORTHINGTON

BY Everett A. Gartrell
ATTORNEY

Aug. 11, 1964 A. J. RIDEOUT ETAL 3,144,366

METHOD OF FABRICATING A PLURALITY OF PN JUNCTIONS IN A SEMICONDUCTOR BODY

Filed Aug. 16, 1961 6 Sheets-Sheet 5

United States Patent Office 3,144,366
Patented Aug. 11, 1964

3,144,366

METHOD OF FABRICATING A PLURALITY OF PN JUNCTIONS IN A SEMICONDUCTOR BODY

Arthur J. Rideout, Millbrook, and Thomas K. Worthington, Wappingers Falls, N.Y., assignors to International Business Machines Corporation, New York, N.Y., a corporation of New York Filed Aug. 16, 1961, Ser. No. 131,771
13 Claims. (Cl. 148—179)

The present invention is directed to the method of fabricating a plurality of PN junctions in a semiconductor body and, more particularly, to the fabrication of a plurality of such junctions in a single semiconductor starting wafer from which a large number of semiconductor devices are to be made.

The present trend in the electronics and the computer fields is toward the miniaturization of semiconductor or solid-state components. Today efforts are being made to manufacture successfully a multiplicity of semiconductor devices from a single small wafer of semiconductor material. For example, it may be desirable to make about 400 transistors having substantially identical dimensional and electrical characteristics from a single semiconductor starting wafer which is less than one-half inch square and has a thickness of about 10 mils. This is accomplished by creating preselected patterns of conductivity zones of different types and terminal regions for those zones by the use of small intricately apertured diffusion and alloying masks for protecting predetermined portions of the surface of the semiconductor wafer during fabrication while exposing other surfaces to the influence of the diffusing and alloying materials. Very small cutaway portions or apertures having 2 x 4 mil dimensions and junction spacings of about 0.1 mil at the surface of a diffused transistor may be required for some applications. Such extremely small dimensional requirements, together with precise electrical characteristics, are difficult to realize in semiconductor devices which are fabricated in this multiple fashion.

Silicon monoxide is one of several materials which is receiving wide acceptance in a semiconductor art for use as a diffusion and alloying mask. Silicon monoxide may be evaporated to form a thin impervious adherent film on predetermined surface areas of a semiconductor wafer. A geometric pattern of tiny apertures in the film exposes predetermined areas of a surface of the semiconductor. The exposed areas or regions are thus conditioned to receive evaporated metal contacts which serve as terminals, or those regions may be subjected to the influence of the vapors or other sources of active impurities which modify the conductivity of the exposed regions. PN junctions and terminals for the regions of different conductivities may thus be made in predetermined areas of a semiconductor device by the use of apertured silicon monoxide films.

Heretofore metal masks have been used with some success in making semiconductor devices. When such masks are employed to form tiny apertures or windows through which the diffusion operations may be accomplished, they have proved to be impractical in the simultaneous manufacture a multiplicity of semiconductor devices to precise dimensions and uniform electrical characteristics. During diffusion operations, doping impurity atoms not only pass through the apertures in the metal masks resting on the semiconductor wafers but also penetrate with ease the regions under the mask and undesirably alter the conductivity of those regions. Mechanical registration and mounting problems have proved to be entirely too severe when apertured metal masks are employed in the fabrication in multiple of various portions of semiconductor devices.

Photoengraving techniques have also been tried in the environment just mentioned but have not proved to be entirely successful. For such methods, the surface of a continuous coherent film of a material such as silicon monoxide intimately attached to the surface of a semiconductor wafer is coated with a photosensitive material to form a resist, and the latter is exposed to light through an apertured mask or stencil. The portions of the resist that were exposed to the light are insoluble in a developing a fluid and remain as a film on the silicon monoxide film while the portions of the resist that were protected from the light by the apertures in the stencil are dissolved by the fluid, thus leaving a plurality of apertures in the resist. These apertures in turn expose small areas of the silicon monoxide film. Thereafter a corrosive fluid of a solution such as hydrofluoric acid is applied to the photoresist and to the exposed areas of the silicon monoxide to etch a pattern of tiny apertures in the silicon monoxide film. In subsequent fabrication operations which are employed in making semiconductor devices such as transistors, impurity materials may be diffused through these apertures in the silicon monoxide mask into the semiconductor wafer to create a pattern of PN junctions, or metallic contacts may be evaporated on the exposed portions of the semiconductor wafer to form terminals thereon.

The photoengraving technique has not proved to be entirely satisfactory for a number of reasons. The resist coating is often attacked and partially destroyed by the hydrofluoric acid, and this unfortunately alters the finenes in the detail and resolution of the resist pattern and, in turn, undesirably changes the critical dimensions of the tiny apertures or cut-out portions established in the silicon monoxide film. As a result, the change seriously modifies the dimensional pattern of the diffused or alloyed regions of the semiconductor wafer so that the multiplicity of PN junctions or other elements of the semiconductor devices fabricated on the semiconductor wafer cannot be made with the precision that is desired. Consequently, the individual devices made from that wafer lack uniformity in geometry and electrical characteristics, and this is intolerable in the manufacture in multiple of miniature semiconductor devices intended to meet critical electrical standards.

The use of the photoengraving technique in the manufacture of semiconductor devices has additional disadvantages in that it is more costly and time-consuming than is desired. This cost is reflected in that of the photoresist materials and the developing fluid. Time is consumed not only in dissolving portions of the photoresist which were not exposed to light but also in baking the assembly in an oven for about ten minutes to harden the undissolved photoresist containing the desirable pattern of openings. Furthermore, when thick silicon monoxide masking films are required on the semiconductor wafer for some applications, it has been found that the photoresist film when subject to the hydrofluoric acid employed in etching the pattern of holes in the silicon monoxide film, does not stand up long enough to permit the proper etching of those holes.

It is an object of the present invention, therefore, to provide a new and improved method of fabricating a plurality of PN junctions in a semiconductor body.

It is another object of the invention to provide a new and improved method of employing apertured masks in the fabrication of a plurality of PN junctions in a semiconductor body.

It is a further object of the invention to provide a new and improved method of employing apertured diffusion masks in the fabrication of a plurality of PN junctions from a single semiconductor starting wafer.

It is yet another object of the invention to provide a new and improved method of fabricating a multipilcity of PN junctions to precise dimensions in a single semiconductor starting wafer.

It is an additional object of the present invention to provide, in the manufacture of a semiconductor device, a new and improved method of applying to a semiconductor body an inert coherent film having sharply defined apertures of extremely small dimensions.

In accordance with a particular form of the invention, the method of fabricating a plurality of PN junctions in a semiconductor body comprises depositing on predetermined portions of a surface of that body a first film of a material which is soluble in a medium that is not detrimental to that body, and establishing on that first film and the exposed portions of the aforesaid surface an impervious film of a material which has a low solubility in the aforesaid medium and has a thickness substantially that of the first film. The method further includes subjecting the assembly to that medium to dissolve the first film by atacking the edge portions thereof and then undermining the remainder to dislodge the impervious film over the first film, thus exposing the aforesaid predetermined portions of the surface of the body without appreciably disturbing the remainder of the impervious film. The method further includes establishing a plurality of PN junctions under the aforesaid exposed surfaces.

Also in accordance with the invention, in the manufacture of a semiconductor device, the method of applying an apertured coherent film to a semiconductor body comprises depositing on predetermined portions of a surface of that body a first film of alkali halide which is soluble in a medium that is not detrimental to the body. The method also includes establishing on that first film and the exposed portions of the aforesaid surface an impervious film of a material which has a low solubility in the above-mentioned medium and has a thickness substantially that of the first film. The method further includes subjecting the assembly to the aforesaid medium to dissolve the first film by attacking the edge portions thereof and then undermining the remainder to dislodge the impervious film over the first film, thus exposing the aforesaid predetermined portions of the surface of the body without appreciably disturbing the remainder of the impervious film.

The foregoing and other objects, features and advantages of the invention will be apparent from the following more particular description of a preferred embodiment of the invention, as illustrated in the accompanying drawings.

Figures 1, 4:
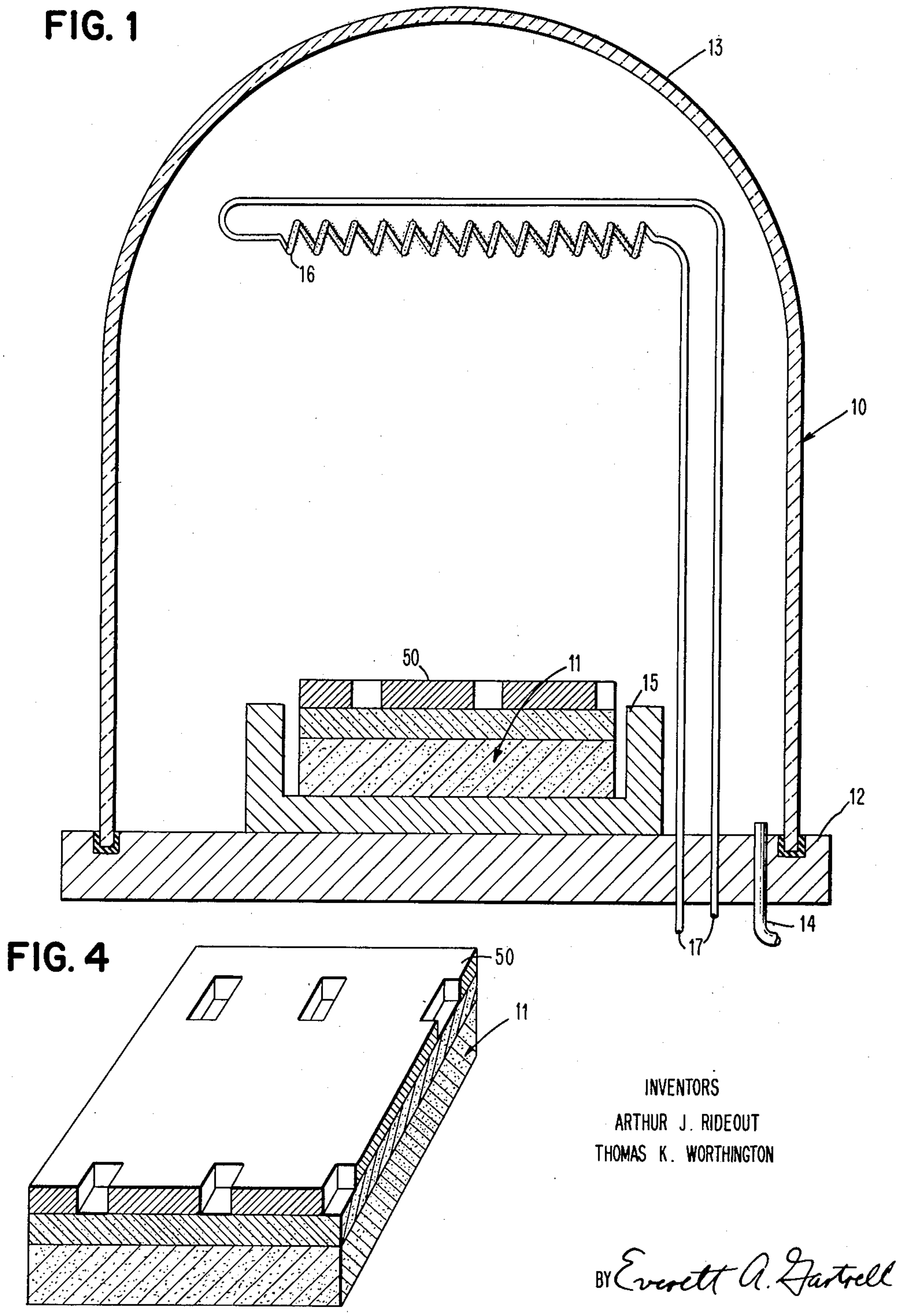
FIG. 1 is a perspective view of an apparatus for evaporating a film on a semiconductor body.
FIG. 4 is a view of a corner portion of a wafer with a mask superimposed thereon for making the assembly of FIG. 3.

Referring now more particularly to FIG. 1 of the drawings, there is represented, in accordance with one aspect of the present invention, an evacuable vaporizer 10 which may be employed for depositing on predetermined portions of a surface of a semiconductor body 11, such as that represented to an enlarged scale in FIG. 2 and to be described subsequently, a first film of a material which is soluble in a medium that is not detrimental to that body. To that end, the vaporizer, which may be of conventional construction, includes a base 12 and a cover 13 that may be suitably sealed thereto during the evacuation of air from its chamber through a tube 14. The semiconductor body 11 rests on a suitable support 15 during the vaporizing operation. Material to be vaporized on the upper surface of the body 11 is heated in a filament cup or it may be incorporated on the surface of a filament 16 which is connected to a source of electrical energy through a pair of conductors 17, 17.

Figure 2:
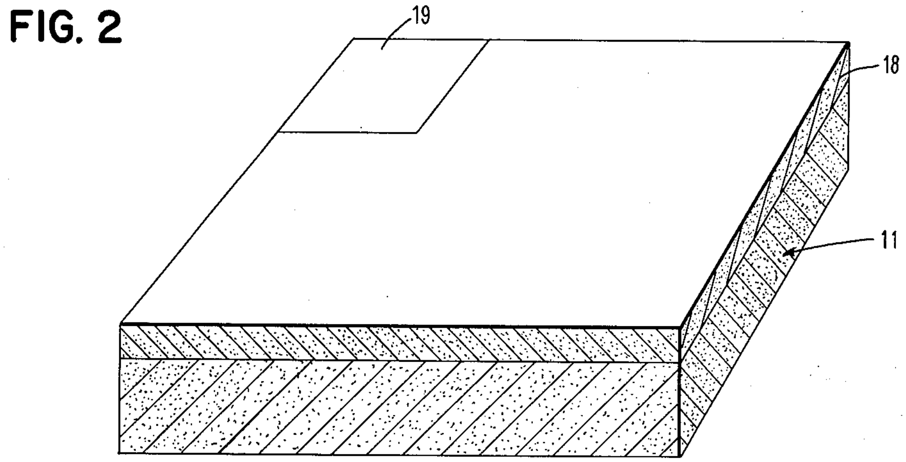
FIG. 2 is a perspective view of a semiconductor wafer employed in the fabrication of a multiplicity of semiconductor devices.
Figure 3:
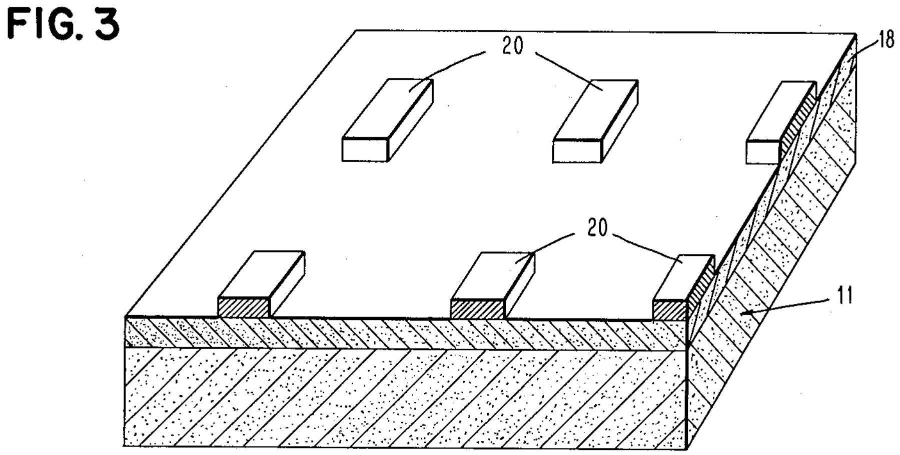
FIG. 3 is a similar view of a corner portion of a semiconductor wafer with a film deposited on predetermined portions thereof.

Reference is now made to FIG. 2 where there is shown in perspective a typical semiconductor body 11 or wafer which is employed in the fabrication of a plurality of semiconductor devices in accordance with the techniques of the present invention. The wafer represented may be of semiconductor material such as N conductivity type germanium. In a particular embodiment it may be about 0.48" long, 0.48" wide, and 10 mils thick and includes on its upper portion a diffused P-type layer 18 that is about 0.2 mil thick. It will be understood, however, that the dimensions which are given above are representative and that other semiconductor materials such as silicon may be employed as the wafer or body 11. Since it is expedient from a manufacturing standpoint to make a multiplicity of semiconductor devices such as transistors, for example about 400 thereof, with substantially identical physical and electrical characteristics from a single such wafer, one will sense that the geometric problems involved in the fabrication of those devices are very delicate. To simplify the problem of representation, the techniques employed in the fabrication of but a few semiconductor devices from a single wafer will be illustrated. To that end, FIG. 3 represents only the upper left hand corner 19 of the semiconductor body 11 of FIG. 2. It will be understood, however, that the techniques to be described are those employed in making the 400 devices from the wafer of FIG. 2, and that the corner 19 actually is not cut out of the wafer during fabrication but is employed only for convenience of illustration. In order precisely to perform subsequent diffusion and alloying operations, a masking means comprising a film of impervious material having a multiplicity of tiny apertures therein must be adherently secured to the upper surface of the P-type region 18 of the wafer 11. The apertures in this masking means will have extremely small dimensions such as 2 x 4 mils and should be sharply defined in order precisely to outline the diffused regions established by a subsequent diffusion step. By the term sharply defined, one means that the size of the openings are cleancut and are as nearly perpendicular to the upper surface of the wafer as is possible. It has been determined that these apertures may best be established by depositing on predetermined portions of the upper surface of the layer 18 a first film 20 which is solvent in a medium that effectively is not detrimental to the semiconductor body. A film of an alkali halide such as sodium chloride or potassium chloride has proved to be inexpensive, simple to apply, easy to remove when required, and to constitute a positive mask which subsequently assures sharply defined tiny openings in the subsequently applied impervious film to be described hereinafter. The alkali halide film 20, which in effect constitutes a multiplicity of salt patches, may be applied in a variety of ways such as through the openings in an apertured molybdenum mask 50 represented in FIGS. 1 and 4. A very satisfactory means for coating the semiconductor body with these salt patches is to evaporate at a temperature of about 850° C. sodium chloride which is on the filament 16 in the evaporator of FIG. 1 so that it penetrates the openings in the mask 50 and is deposited as a solid on the mask and on the cooler semiconductor body which remains at around room temperature. When the semiconductor wafer or body 11 and the mask 50 thereon are removed from the vaporizer 10 and the mask separated from the wafer, a fragmentary portion of the wafer appears as represented in FIG. 3. The edges of the salt film or patches prove to be sharply defined.

Next, there is deposited on the first film 20 of salt patches and on the exposed portions of the top surface of the semiconductor body 11 represented in FIG. 3 an impervious film of a material which has a low solubility in the solvent material for the film 20 and has a thickness that is substantially that of film 20. While a variety of materials such as magnesium fluoride, silicon dioxide, and silicon monoxide may be employed to form a thin film which adheres very tightly to the upper surfaces of the semiconductor wafer and the salt patches, a film 21 having the pattern represented in FIG. 5, of silicon monoxide, a mixture of silicon monoxide and silicon dioxide, or the mixture just mentioned together with some silicon, has proved to be extremely desirable for the purpose just mentioned. As employed in this application, the term silicon monoxide is used to designate the silicon materials just mentioned as well as a material selected from the class of silicon and an inorganic compound of silicon. A suitable material, which is believed to be of the mixed oxide form, is sold as silicon monoxide by the Kemet Co., a division of Union Carbide & Carbon Corp., of 30 E. 42nd Street, New York, New York, and also by Vacuum Equipment, a division of the New York Air Brake Co., of 1325 Admiral Wilson Blvd., Camden 1, New Jersey. Film 21 preferably has a thickness that is slightly less than that of the salt film 20. To that end, the film 21 may have a thickness of about 0.2 mil while that of the film 20 is about 0.3 mil. The film 21 is deposited in a suitable manner as by evaporating the silicon monoxide in an evacuated chamber, such as that represented in FIG. 1 through the openings in a metal mask having such a configuration as to leave a coating having a pattern illustrated in FIG. 5. One convenient way is to energize a filament coated with the silicon monoxide so as to heat that filament to a temperature of about 1600° C., whereupon the coating material evaporates or sublimes and then condenses as a tough film 21 that covers and is intimately bonded to both the exposed cooler top surface of the P-type layer 18 and the top surface of the salt patches 20. During this evaporating operation, the semiconductor wafer 11 and the salt film have a temperature which is in the range of 300–400° C. During deposition, the silicon monoxide film desirably exhibits a growth which is primarily in a direction perpendicular to the surface of the semiconductor body to which it adheres very tightly.

Sodium chloride possesses a number of important advantages when used to make the film 20. It is very inexpensive and may be easily evaporated. When it is evaporated on a semiconductor body, it adheres intimately to that body and does not react therewith. Also the salt becomes a closely packed granular medium which more nearly resembles a solid than it does a granular material. Unlike waxes and such materials which have been used as masking films on semiconductor wafers, it has been found that salt films, if kept in a proper atmosphere, do not tend to spread or creep after a period of time. A salt film is also dimensionally stable at the 300–400° C. temperature of the wafer during the silicon monoxide evaporation operation, a characteristic not possessed by other removable film materials. Furthermore, the sodium chloride film is impervious to the silicon monoxide during the evaporation of the latter on the surface of the wafer and on top of the salt film.

Figure 5:
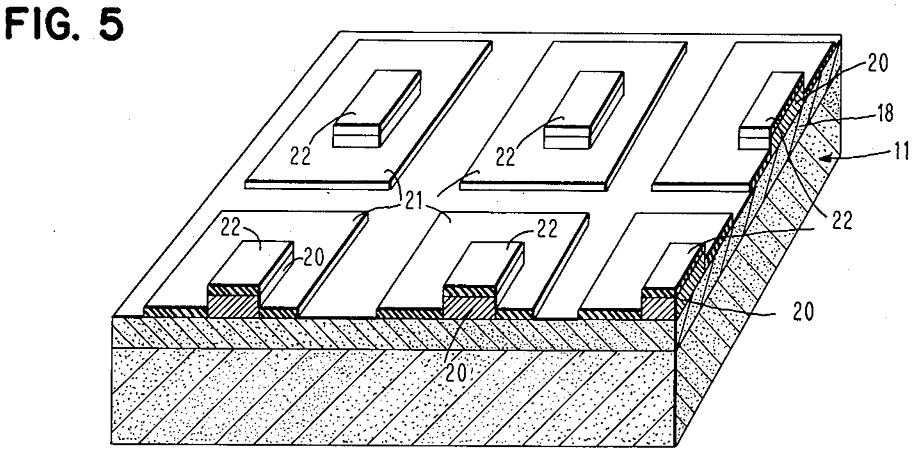
FIG. 5 is a perspective view of a semiconductor wafer with another film deposited thereon.
Figure 6:
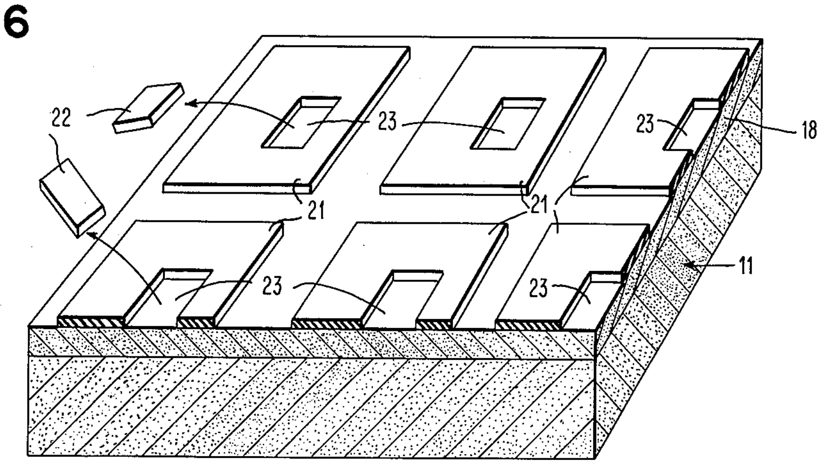
FIG. 6 is a smiliar view of a wafer representing a subsequent step in the manufacture of semiconductor devices such as transistors.

In the next step, the assembly represented in FIG. 5 is subjected to a suitable medium to dissolve the first film 20 of salt patches by first attacking the edge portions thereof and then undermining the remainder to dislodge the patches 22 of the impervious film over the salt patches, thus exposing predetermined portions of the surface of the semiconductor body 11 without appreciably disturbing the remainder of the impervious or continuous film 21. This may be conveniently accomplished by immersing the assembly in a bath of water having a temperature of about 70° C. The bath attacks or dissolves the edge portions of the salt patches 20 and then proceeds to undermine the remaining portions of the patches by dissolving those portions. Agitation of the bath helps to carry away the silicon monoxide patches 22 and this in turn exposes predetermined portions of the semiconductor body 11, namely portions of the top surface of the P-type layer 18 as represented in FIG. 6. In this way, tiny yet sharply defined apertures 23 which have dimensions such as 2 x 4 mils are created in the silicon monoxide film 21 which will subsequently serve as a diffusion mask. While the salt patches or film 20 may have a thickness substantially that of the silicon monoxide patches 22, more effective disintegration of those salt patches and removal of the silicon monoxide patches occurs when the former are somewhat thicker than the latter. Other liquids may also be employed to dissolve the salt patches. Aqueous solutions containing an acid such as hydrofluoric acid may be employed. For example, the assemblies have also been immersed for 12 seconds in an ultrasonically agitated solution containing 100 cc. of 48% hydrofluoric acid and 100 cc. of water, after which they are removed and given an agitated rinse in distilled water. The operation is then repeated except that the second immersions is for 5 seconds in the dilute acid. In both instances, the concentration of the acid in the bath and the immersion period are not sufficient adversely to affect the silicon monoxide film 21 that is anchored to the upper surface of the germanium body 11.

Figure 7:
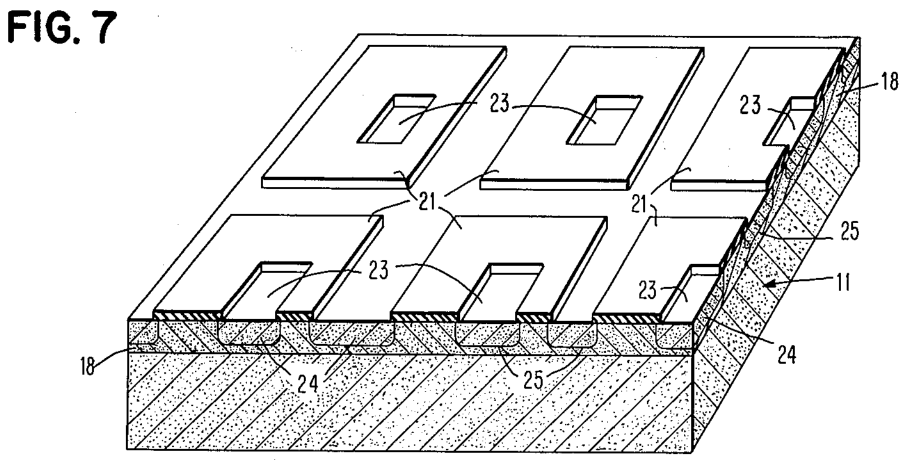
FIG. 7 is another view of the wafer after a diffusing operation.

In the next operation, the assembly represented in FIG. 6 is conditioned so that predetermined portions of the surface of the semiconductor body have established thereunder a plurality of PN junctions. While alloying or other techniques may be employed, for the device under consideration this operation will be considered as a diffusion step wherein an N-type impurity such as arsenic is diffused in a conventional manner into the P-type layer 18 through the apertures 23, 23 and the other openings in the silicon monoxide film 21 which serves as a diffusion mask. This step thus forms, as represented in FIG. 7, the N-type regions 24, 24 and thereby creates a plurality of PN junctions 25, 25 between the layer 18 and the regions 24, 24. It will be observed that in the diffusion operation the impurities creep or diffuse for a short distance under the edge portions of the silicon monoxide film 21.

Figure 8:
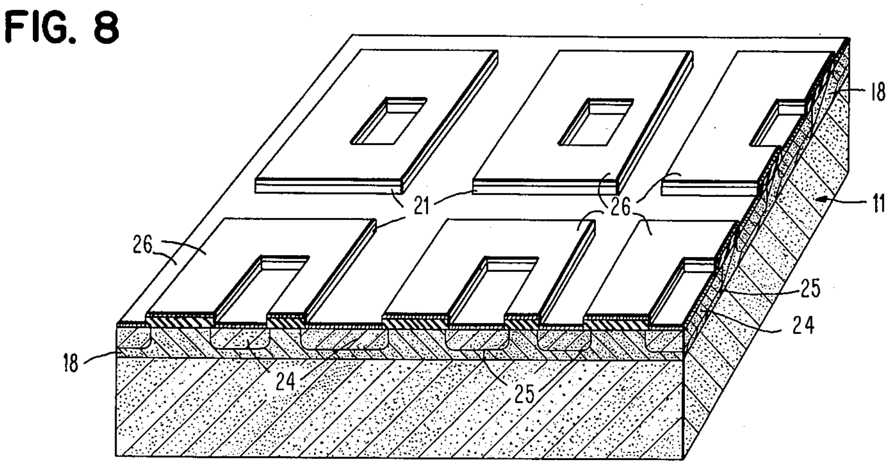
FIG. 8 is an additional view of the wafer after an additional fabrication operation.

Next a thin conductive film 26 of a material such as silver is applied to the entire top surface of the structure represented in FIG. 7 to form the structure of FIG. 8. This film may be applied in a variety of ways such as by spraying or by evaporation. A film, which has a thickness of about 0.04 mil thick and is deposited by evaporation in a structure similar to that of FIG. 1, has proved to be very satisfactory to provide the assembly represented in FIG. 8.

In the next operation, the assembly is introduced into an alloying furnace for the purpose of alloying the portions of the conductive film 26 resting on the N-type regions 24, 24 with those regions. This alloying operation creates ohmic contacts for the semiconductor regions 24, 24 and is accomplished in a conventional manner by heating the unit above the eutectic temperature of the semiconductor body 11 and the metal film 26 for a few minutes in a reducing atmosphere in an alloying furnace, thereby producing the structure represented in FIG. 9. For example, the unit of FIG. 8 may be heated to a temperature of about 700° C. for 2 to 5 minutes, which temperature is well below the melting temperature of the silicon monoxide film 21. During the alloying operation, the metal film which was resting on top of the silicon monoxide film 21 tends to ball up and create particles or balls 27, 27 because the surface tension of the liquid metal on the silicon monoxide film exceeds the interfacial tension between that liquid and the silicon monoxide film. However, the thickness of the metal film on the semiconductor material of regions 24, 24 and the interfacial tension established between that metal film and the semiconductor are such that the balling does not occur over the semiconductor material.

Figure 9:
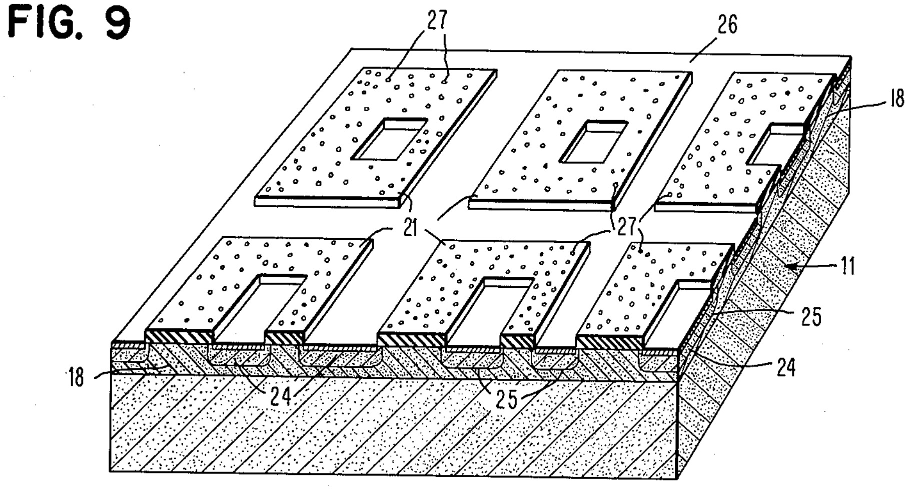
FIG. 9 is still another perspective view of the wafer after an alloying operation.
Figure 10:
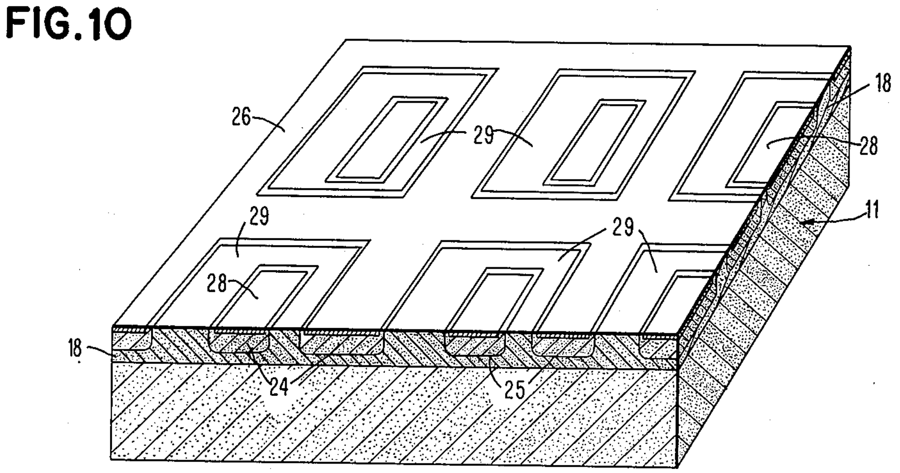
FIG. 10 is yet another perspective view of the wafer following a further fabrication operation.

In a subsequent step, the assembly of FIG. 9 is immersed for a period of time in a hydrofluoric acid bath of sufficient concentration to dissolve or disintegrate the silicon monoxide. In so doing, the balled-up silver particles drop off into the bath leaving the structure illustrated in FIG. 10 wherein various of the alloyed regions 28, 28 may be employed subsequently to form emitter contacts. It will be observed that portions 29, 29 of the P-type region 18 which formerly were beneath the silicon monoxide film 21 shown in FIG. 9 now extend to the top surface of the assembly as represented in FIG. 10. Since the P-type region 18 together with the portions 29, 29 are to form the base regions for the various transistors in a manner to be described hereinafter, it will be necessary to attach ohmic base contacts to various of the portions 29, 29. This may be accomplished by applying an apertured metal mask or stencil having the proper pattern of 2 x 4 mil apertures to the top of the assembly of FIG. 10, and then evaporating silver or other suitable metal contacts 30, 30 of proper thickness (see FIG. 11) through those apertures. Thereafter the contacts are alloyed to the semiconductor portions 29, 29 in a conventional manner. Then the top of the assembly is scribed with a diamond-edged tool along a series of mutually perpendicular lines 31, 32 (represented in broken-line construction) having 20 mil spacings. In a subsequent operation to be described later, the wafers are to be cracked along weakened portions represented diagrammatically by those lines.

Figure 11:
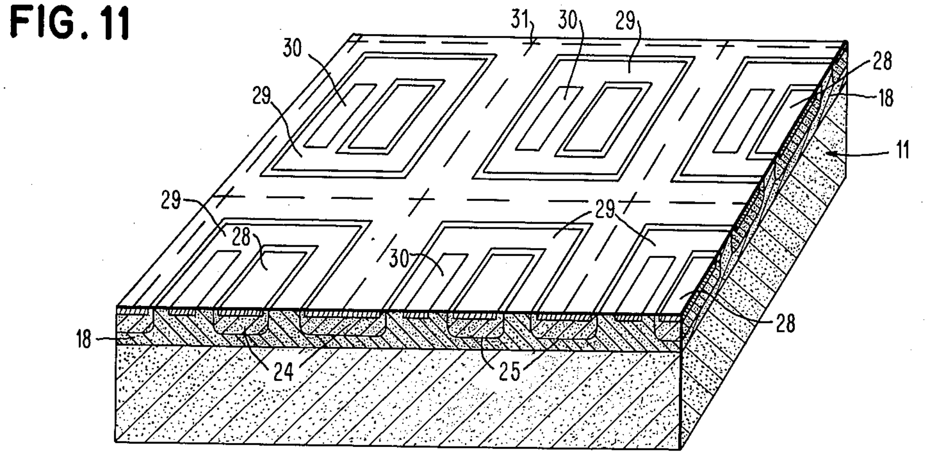
FIG. 11 is a perspective view representing the wafer after a terminal fabrication operation.
Figure 12:
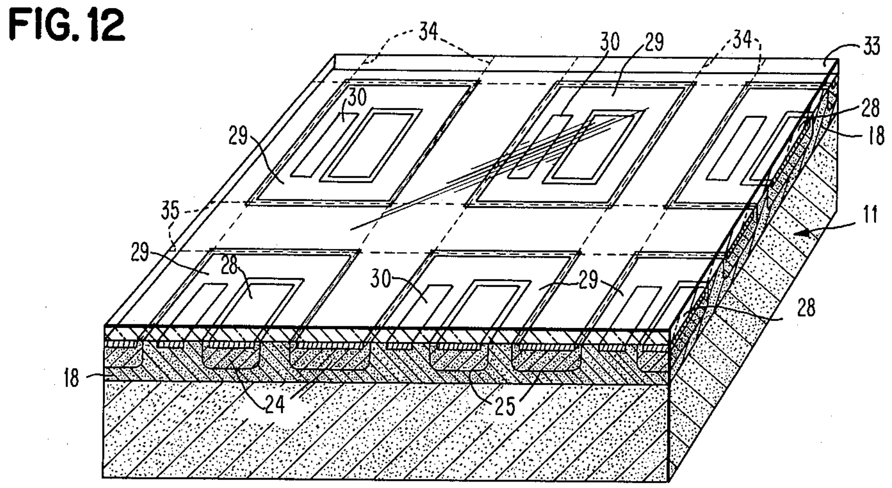
FIG. 12 is a similar view of the wafer after an additional fabrication operation.
Figure 13:
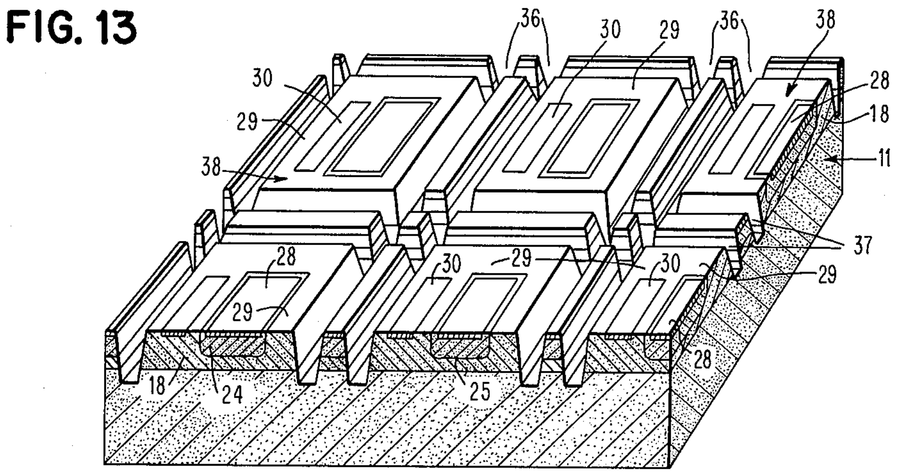
FIG. 13 is a perspective view representing a further step in the fabrication of the wafer.

Next, the top surface of the structure of FIG. 11 is covered with a film of a conventional acid-resistant material such as a wax 33 which is shown in FIG. 12. The wax is then scribed with a chisel-edged tool to form a pattern of mutually perpendicular lines 34, 35 (represented for convenience of illustration as the broken lines) which extend through the wax to the top surface of the semiconductor wafer. When the surface of the wafer thus exposed by that scribing operation is subjected to an etching bath comprising a well-known solution of hydrofluoric acid, acetic acid, and nitric acid, mutually perpendicular moats or trenches 36, 37 as shown in FIG. 13 are etched through the metal coating 26 and through the P-type region 18 into the N-type region of the wafer 11. This operation forms a multiplicity of transistor mesa units 38, 38, for example 400 thereof (only a few of which are shown in FIG. 13), individual ones of which are to be employed in making individual transistors in a manner to be explained shortly.

The semiconductor wafer assembly of FIG. 13 (only a small portion of the entire assembly being shown to simplify the illustration of the intricate structure) has a piece of pressure-sensitive adhesive tape such as Cellophane tape applied to the mesa side thereof. Then the assembly is placed on a rubber pad with the face carrying the scribed or weakened lines 31, 32 resting against the pad. Pressure is applied with a straight-edged tool to the wafer at each weakened line, thus cracking the wafer into 400 individual assemblies corresponding to the assembly 39 represented in FIG. 14. The pressure-sensitive tape is removed by immersing the assembly of FIG. 13 in a suitable solvent such as toluene.

Figure 14:
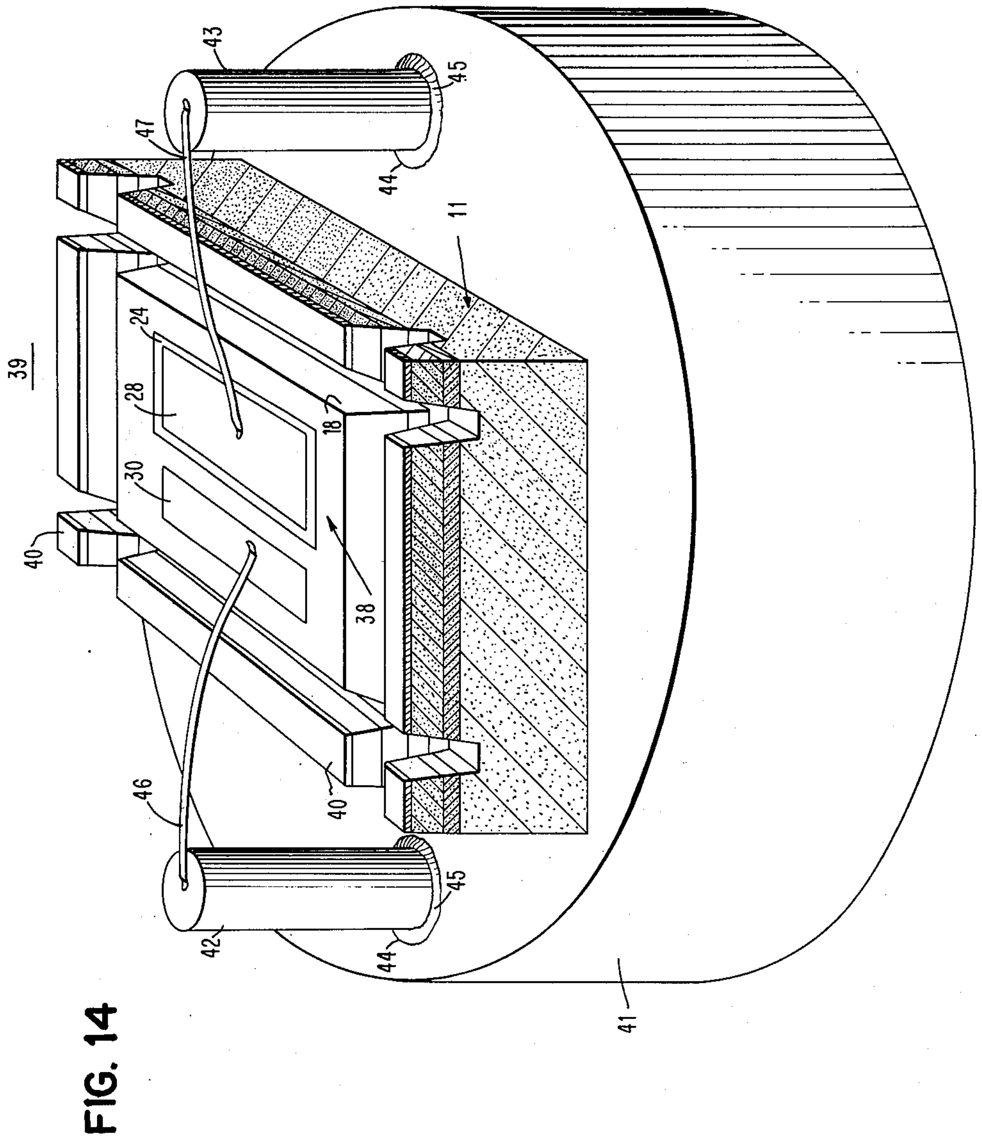
FIG. 14 is a perspective view showing the use of a semiconductor chip in the manufacture of a mesa transistor.

Referring now to FIG. 14, it will be seen that the assembly 39 includes a mesa unit 38 which is provided with ohmic emitter and base contacts 28 and 30, respectively, and is surrounded by other unused mesa members 40, 40. The bottom surface of the assembly 39 is bonded with a suitable solder to a metal header 41 which has a pair of leads or terminals 42 and 43 projecting through, anchored in, and hermetically sealed in bores 44, 44 in the headers by glass insulating members 45, 45. The header 41 constitutes a collector terminal for the transistor. A base lead 46 is bonded to the terminal 42 and to the base contact 30 in a suitable manner as by thermocompression bonding techniques which have been published by H. W. Christensen in the April 1958 issue of The Bell Telephone Record at pages 127 to 130. Briefly, this procedure involves the application of heat and pressure by a chisel-edged tool to the ends of the lead 46 resting on the terminal 42 and on the metal contact of the film 30 so as to effect good mechanical and electrical bonds at the points of interconnection. Similarly, an emitter lead 47 is bonded to the terminal 43 and to the emitter contact 28. The device which has been described is now ready for such conventional cleaning, testing and encapsulation operations as may be necessary to complete the transistor, which one will readily recognize as being a mesa transistor having diffused base and emitter regions.

From the foregoing description and explanation, it will be seen that the method of the present invention affords a simpler and less expensive procedure for manufacturing with a very high degree of accuracy a multiplicity of superior tiny PN junction devices from a single small semiconductor wafer. It will also be clear that the techniques of the present invention lend themselves to the effective manufacture in multiple of extremely small semiconductor devices having diffused PN junctions. It will further be apparent that the method of the present invention permits the economical manufacture to precise dimensions of a multiplicity of delicate PN junction devices having substantially uniform electrical characteristics.

While the invention has been particularly shown and described with reference to a preferred embodiment thereof, it will be understood by those skilled in the art that various changes in form and details may be made therein without departing from the spirit and scope of the invention.

What is claimed is:

1. The method of fabricating a plurality of PN junctions in a semiconductor body comprising: depositing on predetermined portions of a surface of said body a first film of a material which is soluble in a medium that is not deterimental to said body; establishing on said first film and the exposed portions of said surface an impervious film of a material which has a low solubility in said medium and has a thickness substantially that of said first film; subjecting the assembly to said medium to dissolve said first film by attacking the edge portions thereof and then undermining the remainder to dislodge said impervious film over said first film, thus exposing said predetermined portions of said surface of said body without appreciably disturbing the remainder of said impervious film; and establishing a plurality of PN junctions under said exposed surfaces.

2. The method of fabricating a plurality of diffused PN junctions in a semiconductor body comprising: depositing on predetermined portions of a surface of said body a first film of a material which is soluble in a medium that is not detrimental to said body; establishing on said first film and the exposed portions of said surface an impervious film of a material which has a low solubility in said medium and has a thickness substantially that of said first film; subjecting the assembly to said medium to dissolve said first film by attacking the edge portions thereof and then undermining the remainder to dislodge said impervious film over said first film, thus exposing said predetermined portions of said surface of said body without appreciably disturbing the remainder of said impervious film; and diffusing into said exposed surfaces of said body an impurity which is effective to establish thereunder a plurality of PN junctions.

3. The method of fabricating a plurality of PN junctions in a semiconductor body comprising: evaporating on predetermined portions of a surface of said body a first film of a material which is soluble in a medium that is not detrimental to said body; establishing on said first film and the exposed portions of said surface an impervious film of a material which has a low solubility in said medium and has a thickness substantially that of said first film; subjecting the assembly to said medium to dissolve said first film by attacking the edge portions thereof and then undermining the remainder to dislodge said impervious film over said first film, thus exposing said predetermined portions of said surface of said body without appreciably disturbing the remainder of said impervious film; and establishing a plurality of PN junctions under said exposed surfaces.

4. The method of fabricating a plurality of PN junctions in a semiconductor body comprising: coating predetermined portions of a surface of said body with a first film of a salt which is soluble in a liquid that is not detrimental to said body; depositing on said first film and the exposed portions of said surface an impervious film of a material which has a low solubility in said liquid and has a thickness slightly less than that of said first film; immersing the assembly in said liquid to dissolve said first film by attacking the edge portions thereof and then undermining the remainder to dislodge said impervious film over said first film, thus exposing said predetermined portions of said surface of said body without appreciably disturbing the remainder of said impervious film; and establishing a plurality of PN junctions under said exposed surfaces.

5. The method of fabricating a plurality of PN junctions in a semiconductor body comprising: depositing on predetermined portions of a surface of said body a first film of sodium chloride which is soluble in an aqueous solution that is not detrimental to said body; evaporating on said first film and the exposed portions of said surface, while maintaining said first film and said body at a temperature within the range of 300–400° C., an impervious film of a material selected from the class consisting of silicon and an inorganic compound of silicon which has a low solubility in said solution and has a thickness substantially that of said first film; subjecting the assembly to said solution to dissolve said first film by attacking the edge portions thereof and then undermining the remainder to dislodge said impervious film over said first film, thus exposing said predetermined portions of said surface of said body without appreciably disturbing the remainder of said impervious film; and establishing a plurality of PN junctions under said exposed surfaces.

6. The method of fabricating a plurality of PN junctions in a semiconductor body comprising: depositing on predetermined portions of a surface of said body a first film of a material which is soluble in a medium that is not detrimental to said body; establishing on said first film and the exposed portions of said surface an impervious film of a material which has a low solubility in said medium and has a thickness substantially that of said first film; subjecting the assembly to said medium to dissolve said first film by attacking the edge portions thereof and then undermining the remainder to dislodge said impervious film over said first film, thus exposing said predetermined portions of said surface of said body without appreciably disturbing the remainder of said impervious film; establishing a plurality of PN junctions under said exposed surfaces; depositing a thin conductive film on said impervious film and said exposed surfaces; alloying said conductive film with said semiconductor body at said exposed surfaces at a temperature whereat the conductive film on said impervious film balls up thereon; and immersing the assembly in a bath which is effective to remove said impervious film and the balled-up conductive particles thereon without disturbing said alloyed film.

7. The method of fabricating a plurality of PN junctions in a semiconductor body comprising: placing an apertured mask over a predetermined surface of said body; depositing on predetermined portions of said surface a first film of a material which is soluble in a medium that is not detrimental to said body; removing said mask to expose the remaining portions of said surface; establishing on said first film and the exposed portions of said surface an impervious film of a material which has a low solubility in said medium and has a thickness substantially that of said first film; subjecting the assembly to said medium to dissolve said first film by attacking the edge portions thereof and then undermining the remainder to dislodge said impervious film over said first film, thus exposing said predetermined portions of said surface of said body without appreciably disturbing the remainder of said impervious film; and establishing a plurality of PN junctions under said exposed surfaces.

8. The method of fabricating a plurality of PN junctions in a semiconductor body comprising: placing an apertured mask over a predetermined surface of said body; heating sodium chloride to a temperature of about 850° C., while maintaining said body at about room temperature, to evaporate on predetermined portions of said surface a first film of sodium chloride which is soluble in an aqueous solution that is not detrimental to said body; removing said mask to expose the remaining portions of said surface; heating silicon monoxide to a temperature of about 1400° C. to evaporate on said first film and the exposed portions of said surface, while maintaining said first film and said body at a temperature within the range of 300–400° C., an impervious film of silicon monoxide which has a low solubility in said solution and has a thickness substantially that of said first film; maintaining said solution at a temperature of about 70° C. while subjecting the assembly to said solution to dissolve said first film by attacking the edge portions thereof and then undermining the remainder to dislodge said impervious film over said first film, thus exposing said predetermined portions of said surface of said body without appreciably disturbing the remainder of said impervious film; and establishing a plurality of PN junctions under said exposed surfaces.

9. The method of fabricating a plurality of PN junctions in a semiconductor body of one conductivity type comprising: diffusing into one side of said body an impurity which is effective to establish a PN junction and a first region of the opposite conductivity type; depositing on predetermined portions of a surface of said first region a first film of a material which is soluble in a medium that is not detrimental to said body; establishing on said first film and the exposed portions of said surface an impervious film of a material which has a low solubility in said medium and has a thickness substantially that of said first film; subjecting the assembly to said medium to dissolve said first film by attacking the edge portions thereof and then undermining the remainder to dislodge said impervious film over said first film, thus exposing said predetermined portions of said surface of said body without appreciably disturbing the remainder of said impervious film; and diffusing into said exposed surfaces of said body an impurity which is effective to establish thereunder a plurality of PN junctions and a plurality of regions of said one conductivity type.

10. The method of fabricating a plurality of PN junctions in a semiconductor body of one conductivity type comprising: diffusing into one side of said body an impurity which is effective to establish a PN junction and a first region of the opposite conductivity type; depositing on predetermined portions of a surface of said first region a first film of a material which is soluble in a medium that is not detrimental to said body; establishing on said first film and the exposed portions of said surface an impervious film of a material which has a low solubility in said medium and has a thickness substantially that of said first film; subjecting the assembly to said medium to dissolve said first film by attacking the edge portions thereof and then undermining the remainder to dislodge said impervious film over said first film, thus exposing said predetermined portions of said surface of said body without appreciably disturbing the remainder of said impervious film; diffusing into said exposed surfaces of said body an impurity which is effective to establish thereunder a plurality of PN junctions and a plurality of regions of said one conductivity type; depositing a thin conductive film on said impervious film and said exposed surfaces of said plurality of regions of said one conductivity type; alloying said conductive film with said exposed surfaces of said regions of said one conductivity type at a temperature whereat the conductive film on said impervious film balls up thereon; immersing the assembly in a bath which is effective to remove said impervious film and the balled-up conductive particles thereon without disturbing said alloyed film and is further effective to expose the remaining portions of said surface of said first region; depositing thin conductive films on parts of said remaining portions; and alloying said last-mentioned conductive films with said remaining portions of said first region.

11. In the manufacture of a semiconductor device, the method of applying an apertured coherent film to a semiconductor body comprising: depositing on predetermined portions of a surface of said body a first film of an alkali halide which is soluble in a medium that is not detrimental to said body; establishing on said first film and the exposed portions of said surface an impervious film of a material which has a low solubility in said medium and has a thickness substantially that of said first film; and subjecting the assembly to said medium to dissolve said first film by attacking the edge portions thereof and then undermining the remainder to dislodge said impervious film over said first film, thus exposing said predetermined portions of said surface of said body without appreciably disturbing the remainder of said impervious film.

12. In the manufacture of a semiconductor device, the method of applying an apertured coherent film to a semiconductor body comprising: evaporating on predetermined portions of a surface of said body a first film of an alkali halide which is soluble in a medium that is not detrimental to said body; evaporating on said first film and the exposed portions of said surface an impervious film of a material which has a low solubility in said medium and has a thickness substantially that of said first film; and subjecting the assembly to said medium to dissolve said first film by attacking the edge portions thereof and then undermining the remainder to dislodge said impervious film over said first film, thus exposing said predetermined portions of said surface of said body without appreciably disturbing the remainder of said impervious film.

13. In the manufacture of a semiconductor device, the method of applying an apertured coherent film to a semiconductor body comprising: evaporating on predetermined portions of said surface a film of sodium chloride by heating sodium chloride to a temperature of about 850° C., while maintaining said body at about room temperature; evaporating on said first film and the exposed portions of said surface, while maintaining said first film and said body at a temperature within the range of 300–400° C., an impervious film of silicon monoxide having a thickness less than that of said first film by heating silicon monoxide to a temperature of about 1400° C.; ultrasonically agitating a solution of 1 part by volume of 48% hydrofluoric and 1 part by volume of water and immersing the assembly in said solution for 12 seconds; removing said assembly from said solution and rinsing in distilled water; immersing the assembly in said solution for 5 seconds, removing therefrom, and rinsing in water, said immersings and rinsings being effective to dissolve said first film by attacking the edge portions thereof and then undermining the remainder to dislodge said impervious film over said first film, thus exposing said predetermined portions of said surface of said body without appreciably disturbing the remainder of said impervious film.

References Cited in the file of this patent

UNITED STATES PATENTS

| | | |
|---|---|---|
| 2,796,562 | Ellis et al. | June 18, 1957 |
| 2,961,354 | Cleveland | Nov. 22, 1960 |
| 2,995,461 | Boicey et al. | Aug. 8, 1961 |
| 3,006,791 | Webster | Oct. 31, 1961 |

FOREIGN PATENTS

| | | |
|---|---|---|
| 1,097,039 | Germany | Jan. 12, 1961 |

OTHER REFERENCES

IBM Technical Disclosure Bulletin, vol. 3, No. 5, October 1960, page 35.

Aschner et al.: Journal of Electrochemical Society, May 1959, pages 415–417.